United States Patent
Nagae

(10) Patent No.: US 6,603,609 B2
(45) Date of Patent: Aug. 5, 2003

(54) ZOOM LENS BARREL HAVING VARIABLE FULLY-OPEN APERTURE VALUE FUNCTION

(75) Inventor: Ryuichi Nagae, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 10/091,466

(22) Filed: Mar. 7, 2002

(65) Prior Publication Data

US 2002/0141075 A1 Oct. 3, 2002

(30) Foreign Application Priority Data

Mar. 29, 2001 (JP) .................................. 2001-095267

(51) Int. Cl.[7] .............................................. G02B 15/14
(52) U.S. Cl. ...................... 359/699; 359/696; 359/700
(58) Field of Search ................................ 359/699, 700, 359/696, 704, 823, 826

(56) References Cited

U.S. PATENT DOCUMENTS

| | | | |
|---|---|---|---|
| 4,987,435 A | 1/1991 | Touma et al. | 354/195.11 |
| 5,592,335 A * | 1/1997 | Omi et al. | 359/695 |
| 5,646,790 A * | 7/1997 | Kohmoto et al. | 359/823 |
| 5,886,830 A * | 3/1999 | Oono et al. | 359/696 |

FOREIGN PATENT DOCUMENTS

| | | |
|---|---|---|
| JP | 2-254428 | 10/1990 |
| JP | 2-254431 | 10/1990 |
| JP | 8-62668 | 3/1996 |
| JP | 9-211554 | 8/1997 |

\* cited by examiner

*Primary Examiner*—Georgia Epps
*Assistant Examiner*—Tim Thompson
(74) *Attorney, Agent, or Firm*—Fitzpatrick, Cella, Harper & Scinto

(57) ABSTRACT

A lens barrel includes a variable power lens unit, an aperture-variable light-amount adjusting unit having an adjusting member that adjusts the fully open state of the aperture, and a variable power lens control mechanism that shifts the variable power lens unit from a first variable power position to a second variable power position. The variable power lens control mechanism moves the variable power lens unit beyond the second variable power position, then returns it toward the second variable power position, and stops it at the second variable power position. The lens barrel further comprises a cam member having a cam portion with which the adjusting member is engaged, and moves relative to the light-amount adjusting unit in operative association with the control action of the variable power lens control mechanism.

7 Claims, 9 Drawing Sheets

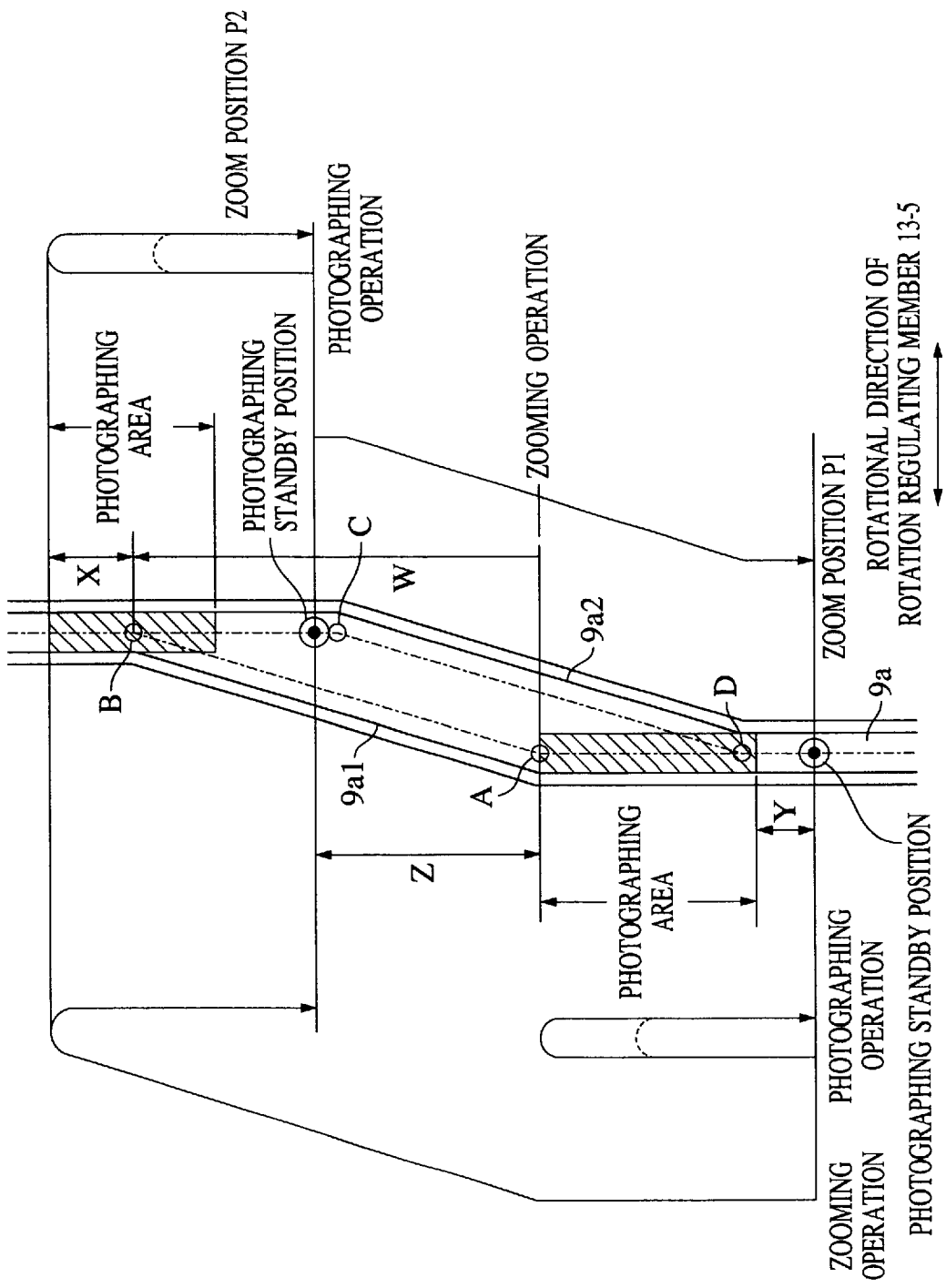

ZOOM LENS BARREL HAVING VARIABLE FULLY-OPEN APERTURE VALUE FUNCTION

BACKGROUND OF THE INVENTION

1. Field of the Invention

The present invention relates to a lens barrel or a camera having a shutter which is used for the exposure control of the camera, and which particularly constitutes a mechanism for changing the fully-open aperture value according to a change in the focal length.

2. Description of the Related Art

Some of the so-called compact cameras wherein a photographing lens group is built in integrally with the camera body, are generally known as "zoom cameras", or cameras having a so-called zoom lens, which cameras allow photographing at an arbitrary photographing visual angle by varying the photographing visual angle. These zoom cameras have a zoom lens barrel capable of being set from the non-photographing position (collapsed state) to the "tele position", that is, the position where the focal length is the maximum, by moving back and forth the photographing lens group in the optical axis direction. Usually, once the power supply of the camera body has been turned on, the camera comes into a ready state for photographing, and photographing can be performed between the "wide position", that is, the position where the focal length is the minimum, and the above-mentioned "tele position".

Some zoom cameras have an aperture changeover mechanism and a shutter opening/closing mechanism which adjust the light amount when photographing. Also, as known in the art, there is a lens shutter mechanism which can serve both as an aperture changeover mechanism and a shutter opening/closing mechanism. In this type of zoom camera having a lens shutter mechanism, the shutter diameter is adjusted so that a desired photograph can be taken by changing the diameter of the lens shutter (aperture) corresponding to the brightness when photographing. As disclosed in Japanese Patent Laid-Open Nos. 2-254428 and 2-254431, a lens shutter mechanism which changes the fully-open aperture diameter (hereinafter, referred to as a "fully-open aperture value") of a lens shutter according to the focal length of a photographing lens, is also known in the art.

On the other hand, with a view to achieving miniaturization and cost reduction of cameras, there are step-type cameras among these zoom cameras. These cameras perform stepwise zooming both during the extension and the withdrawal of a lens barrel, and simultaneously perform focusing during either the extension or withdrawal of the lens barrel during the above-described zooming.

As in a camera proposed in Japanese Patent Laid-Open No. 9-211554, some of these step-type cameras are arranged so that a photographing optical system and a viewfinder optical system are interlocked with each other when the photographing optical system performs zooming, and that this interlocking between the photographing optical system and the viewfinder optical system is disconnected when the photographing optical system performs focusing.

Here, operations of this camera will be described with reference to FIG. 1. FIG. 1 is an operational view of a lens barrel (photographing lens group). When a photographer indicates a desired zoom position after turning on the power supply of the camera body, the lens barrel extends the photographing lens in the optical axis direction by rotating a zoom ring provided in the camera. Here, when the photographer sets a zoom position to the zoom position P1, the lens barrel once extends in the optical axis direction as indicated by the arrow (1), and then withdraws up to the photographing standby position with respect to the zoom position P1. These extension and withdrawal operations of the lens barrel are operations for moving only the viewfinder optical system in the optical axis direction to correct the visual field ratio of the viewfinder at the zoom position P1. In other words, the photographing optical system is interlocked with the viewfinder optical system while the lens barrel extends, but the interlocking thereof with the viewfinder optical system is disconnected while the lens barrel withdraws. As a result, only the viewfinder optical system can be moved in the optical axis direction. This allows the visual field ratio of the viewfinder to be set to an appropriate value. This series of camera operations are operations necessary for achieving a matching state between the visual field of the viewfinder and the photographing optical system of the camera. In addition, this camera action of preventing the lens from moving exclusively in the invariably fixed direction, serves the purpose of eliminating backlash in the gears.

When photographing is conducted at the zoom position P1, the lens barrel performs the operation indicted by the arrow (3). Specifically, by extending the lens barrel based on a subject distance, the camera moves the photographing lens group in the optical axis direction to perform focusing, and after performing an exposure operation by the opening/closing operation of a shutter mechanism, withdraws the lens barrel up to the photographing standby position with respect to the zoom position P1.

The operation of the lens barrel as indicated by arrow (3) is such that the lens barrel extends up to a position in close proximity to the focus point of the lens. However, since the extension amount of the lens barrel varies depending on the subject distance, the operation of the lens barrel is not limited to the operation indicated by the arrow (3).

When photographing is conducted at a zoom position P2 which has a focal length larger than that of the zoom position P1, the lens barrel performs the operation indicated by the arrow (4), as in the case of the zoom position P1.

As described above, in a zoom camera having a lens shutter mechanism, it is necessary to change the fully-open aperture value corresponding to the change in the focal length of the camera, and consequently, the change in the extension amount of the photographing lens in the optical axis direction, as set forth in Japanese Patent Laid-Open No. 2-254428. Herein, if the fully-open aperture value of the lens shutter changes during the focusing of the camera, this will make the exposure control of the camera significantly difficult, and therefore, the fully-open aperture value of the lens shutter is required to be constant during focusing. The changeover of the fully-open aperture value, therefore, must be performed except when focusing is conducted.

The foregoing will be elucidated with reference to FIG. 1. When it is necessary to change the fully-open aperture value of the lens shutter between the zoom positions P1 and P2, the changeover of the fully-open aperture value must be performed except when focusing is conducted, as described above. Therefore, the fully-open aperture value changeover region of the lens shutter mechanism is the region (7) in FIG. 1.

As in the shutter device disclosed in Japanese Patent Laid-Open No. 8-62668 to the same assignee as this application, a mechanism for changing over the fully-open aperture value by driving a cam pin engaged with a cam provided in a lens barrel, is known in the art as a lens shutter mechanism. When such a lens shutter mechanism is provided in a step-zoom type camera, it is necessary to drive a cam pin within the fully-open aperture value changeable region (7).

However, when attempting to perform photographing at many zoom positions or when attempting to minimize the rotational angle of the lens barrel so as to quicken the zooming action of the lens barrel, the range (7), which is the fully-open aperture value changeover region, necessarily must be made small. In the case of a camera which uses the above-described lens shutter mechanism, which changes the fully-open aperture value of the lens shutter by cam drive, it is necessary for the cam provided within the lens barrel to perform a large motion over a small rotational angle. This makes a steep cam lift rise of the drive cam within the lens barrel an inevitable consequence.

On the other hand, since there is a limit to which the amount of the cam can be varied, the limit of the lift amount of the cam formed within the lens barrel is inevitably determined, in order to stably perform cam drive. Once the limit to the cam lift amount has been determined, it is impossible to make the range of the fully-open aperture value changeover region (7) smaller than the limit value of the cam lift amount. There are limits, therefore, to enabling photographing at many zoom positions and to reducing the rotational angle of the lens barrel so as to quicken the zooming action of the lens barrel.

SUMMARY OF THE INVENTION

Accordingly, it is an object of the present invention to provide a lens barrel or a camera which enables photographing at many zoom positions, and allows the rotational angle of the lens barrel to be minimized, so as to quicken the zooming action of the lens barrel without imparing the smooth zooming and focusing of photographing lenses.

In order to achieve the above-described object, the present invention provides a lens barrel which comprises a variable power lens unit; an aperture-variable light-amount adjusting unit which has an adjusting member for adjusting the fully open state of the aperture; a variable power lens control mechanism for shifting the variable power lens unit from a first variable power position to a second variable power position, where the variable power lens control mechanism moves the variable power lens unit beyond the second variable power position, then the variable power lens control mechanism returns the variable power lens toward the second variable power position, and the variable power lens control mechanism stops the variable power lens at the second variable power position; and a cam member having a cam portion with which the adjusting member is engaged, and moving relative to the light-amount adjusting unit in operative association with the control action of the variable power lens control mechanism. Herein, the cam portion has a cam shape that drives the adjusting member while the variable power lens unit is moved at least beyond the second variable power position, but does not drive the adjusting member while the variable power lens unit is returned toward the second variable power position.

Preferably, the cam member moves in the optical axis direction of the variable power lens unit in operative association with the control action.

It is preferable that, when the variable power lens control mechanism shifts the variable power lens from the second variable power position to the first variable power position, the variable power lens control mechanism stop the variable power lens without moving the variable power lens beyond the first variable power position.

Preferably, the cam portion has a cam shape that drives the adjusting member when shifting the adjusting member from the second variable power position to the first variable power position.

It is preferable that the variable power lens control mechanism has a cam ring formed in a manner such that variable power cam portions which drive the variable power lens unit for scaling and focus cam portions which drive the variable power lens unit for focusing during extension of the variable power cam portion, are arranged in an alternating sequence.

Preferably, the cam portion has a cam shape that does not drive the adjusting member when the variable power lens unit moves on the focus cam portion for focusing.

Further objects, features and advantages of the present invention will become apparent from the following description of the preferred embodiments with reference to the attached drawings.

BRIEF DESCRIPTION OF THE DRAWINGS

FIGS. 2A and 2B are views showing the lens barrel provided in the camera according to the embodiment of the present invention, wherein FIG. 2A is a perspective view thereof and FIG. 2B is a sectional view thereof;

FIGS. 7A and 7B are views showing the straight-advance regulating tube 9 in the camera according to the embodiment of the present invention, wherein FIG. 7A is a sectional view thereof and FIG. 7B is a developed view thereof;

FIG. 8 is a partially developed view showing operation of the straight-advance regulating tube 9 in the camera according to the embodiment of the present invention.

DESCRIPTION OF THE PREFERRED EMBODIMENTS

Figure 2A:
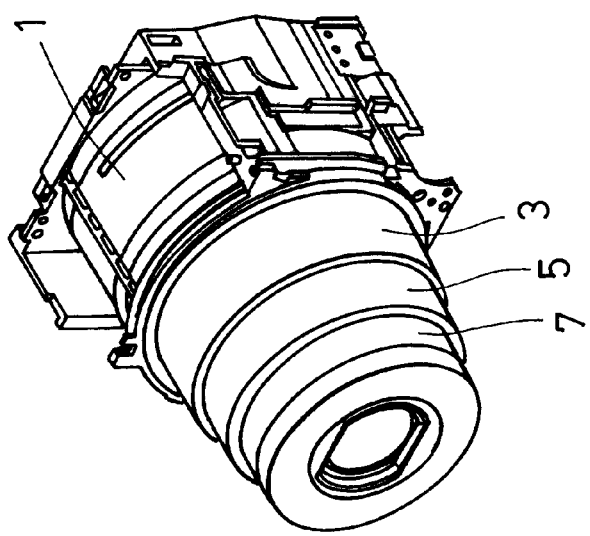
Figure 2B:
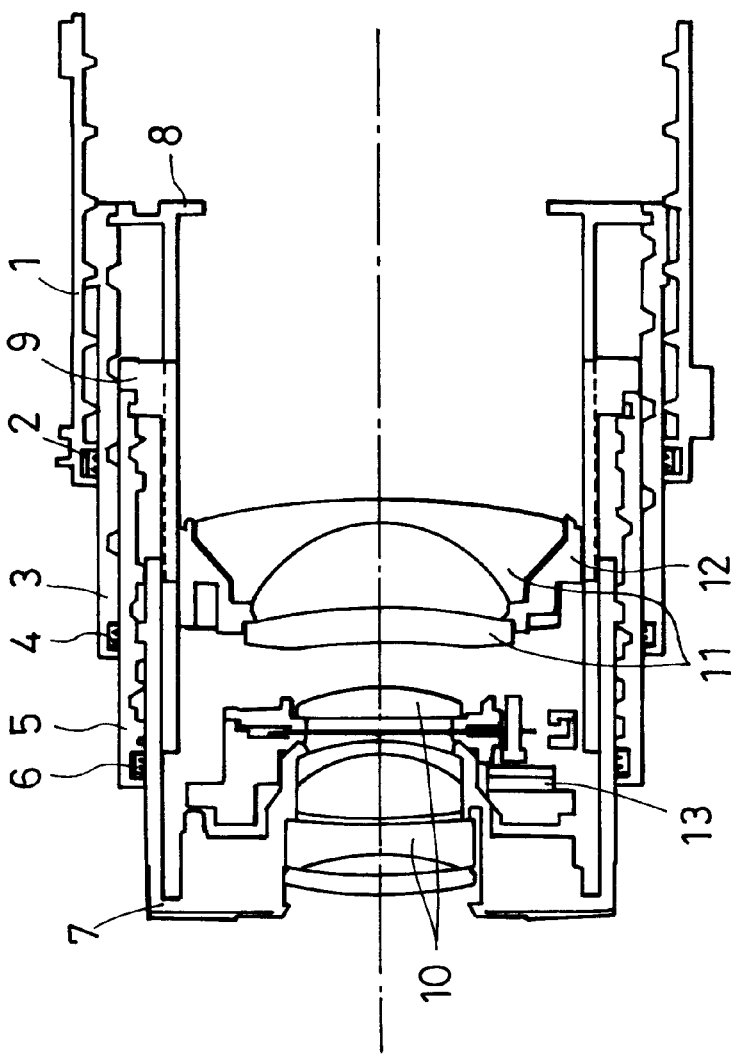

FIGS. 2A and 2B are views showing a lens barrel provided in a camera according to an embodiment of the present invention, wherein FIG. 2A is a perspective view thereof and FIG. 2B is a sectional view thereof.

Referring to FIGS. 2A and 2B, reference numeral 1 denotes a fixed tube fixed to the camera body (not shown). This fixed tube 1 has a helicoid screw formed on the inner peripheral surface thereof. Reference numeral 2 denotes a lightproof rubber seal affixed at the front end of the fixed tube 1 for preventing external light from entering the lens barrel.

Reference numeral 3 denotes a first differential tube, which is rotated about the optical axis by the driving force of a motor (not shown). A helicoid screw is formed on the outer peripheral surface at the rear end portion of the first differential tube 3, and this helicoid screw is engaged with the helicoid screw formed on the fixed tube 1. Thereby, when the first differential tube 3 undergoes the driving force of the motor, the first differential tube 3 moves back and forth in the optical axis direction while rotating about the optical axis in helicoidal engagement with the fixed tube 1. Reference numeral denotes a lightproof rubber seal affixed at the front end of the first differential tube 3.

Reference numeral 5 designates a second differential tube. A rotation transmitting portion (not shown) is formed on the outer peripheral surface of the second differential tube 5. As the first differential tube 3 rotates, the second differential tube 5 also rotates. That is, the rotation transmitting portion (not shown) of the second differential tube 5 is provided so as to be movable relative to the first differential tube 3 in the optical direction, but so as not to inhibit movement of the second differential tube 5 in the optical axis direction. Reference numeral 9 designates a straight-advance regulating tube. This straight-advance regulating tube 9 is engaged with a straight-advance regulating member 8 described later, and is affixed to the second differential tube 5 so as to rub against the rotating second differential tube 5. Also, a cam pin (not shown) is formed on the outer peripheral surface of the straight-advance regulating tube 9 and engaged with a cam groove formed in the inner peripheral surface of the first differential tube 3. When the first differential tube 3 rotates about the optical axis, the cam pin of the straight-advance regulating tube 9 moves back and forth in the optical axis direction under the guide of the cam groove of the first differential tube 3. As a result, the second differential tube 5 and the straight-advance regulating tube 9 can be moved back and forth in the optical axis direction by the rotation of the first differential tube 3. Reference numeral 6 designates a lightproof rubber seal affixed at the front end of the second differential tube 5.

Reference numeral 7 designates a third differential tube for holding a shutter mechanism 13 and a first photographing-lens group 10. A helicoid is formed on the outer peripheral surface of the third differential tube 7. This helicoid is engaged with the helicoid formed on the inner peripheral surface of the second differential tube 5. Also, the helicoid is engaged with the straight-advance regulating tube 9 so as to move in the optical axis direction, so that the third differential tube 7 moves back and forth relative to the second differential tube 5 in the optical axis direction, without rotating.

Reference numeral 8 designates a straight-advance regulating member, which is rotatably captured by the first differential tube 3 so as to rub against the rotating first differential tube 3. Also, the straight-advance regulating member 8 is slidably engaged with the fixed tube 1 so as to rub against the fixed tube 1 in a manner such that its rotation is regulated by the fixed tube 1. In this manner, when the first differential tube 3 moves back and forth in the optical axis direction while rotating about the optical axis, the straight-advance regulating member 8 merely moves back and forth in the optical axis direction.

Reference numeral 12 designates a second lens group holder for holding a second photographing-lens group 11. A cam pin (not shown) is formed on the outer peripheral surface of the second lens group holder 11. This cam pin is engaged with a cam groove formed in the inner peripheral surface of the second differential tube 5 passing through the groove portion extending in the optical axis direction and formed in the straight-advance regulating tube 9. When the second differential tube 5 rotates about the optical axis, the cam pin moves back and forth in the optical axis direction under the guide of the cam groove in the second differential tube 5, thereby moving the second photographing-lens group 11 back and forth in the optical axis direction.

The shutter mechanism (light-amount adjusting unit) 13 is held integrally with the first photographing-lens group 10 by the third differential tube 7, and moves back and forth in conjunction with the third differential tube 7 in the optical axis direction.

The structure of the lens barrel is not limited to the above-described structure. Any structure that performs zooming and focusing by moving the photographing-lens groups (the first photographing-lens group 10 and the second photographing-lens group 11) back and forth in the optical axis direction, may be used. Also, the photographing-lens group is not restricted to the above-described structure. The photographing lens system may instead be constituted of multiple (third, fourth, or more) groups.

As disclosed in the known art, in the case of a step-zoom type lens barrel, a shifting operation is performed when zooming is conducted. Specifically, when the lens barrel is zoomed from the "wide" end side to the "tele" end side, the lens barrel stops at the photographing standby position with respect to a predetermined zoom position by "lens barrel extension→lens barrel withdrawal" operations. On the other hand, when the lens barrel is zoomed from the "tele" end side to the "wide" end side, the lens barrel stops at the photographing standby position with respect to a predetermined zoom position using only a "lens barrel withdrawal" operation. In either case, the lens barrel ultimately stops at a photographing standby position as the result of a "lens barrel withdrawal" operation.

The above-described shifting operation will be described below with reference to FIG. 1.

First, description will be made of the photographing operations (zooming and focusing) of the camera when a zoom position is set to the zoom position P1. When the lens barrel is zoomed from the collapsed state to the zoom position P1, the lens barrel extends from the collapsed state in the optical axis direction upon the turning-on of the power supply of the camera body. As indicated by the arrow (1) in FIG. 1, the lens barrel extends up to a position in close proximity to the focus of the zoom position P1 (i.e., a position where the extension amount of the lens barrel is the maximum in the focus adjustment region (5) with respect to the zoom position P1), and then the lens barrel withdraws up to the photographing standby position with respect to the zoom position P1.

Figure 1:
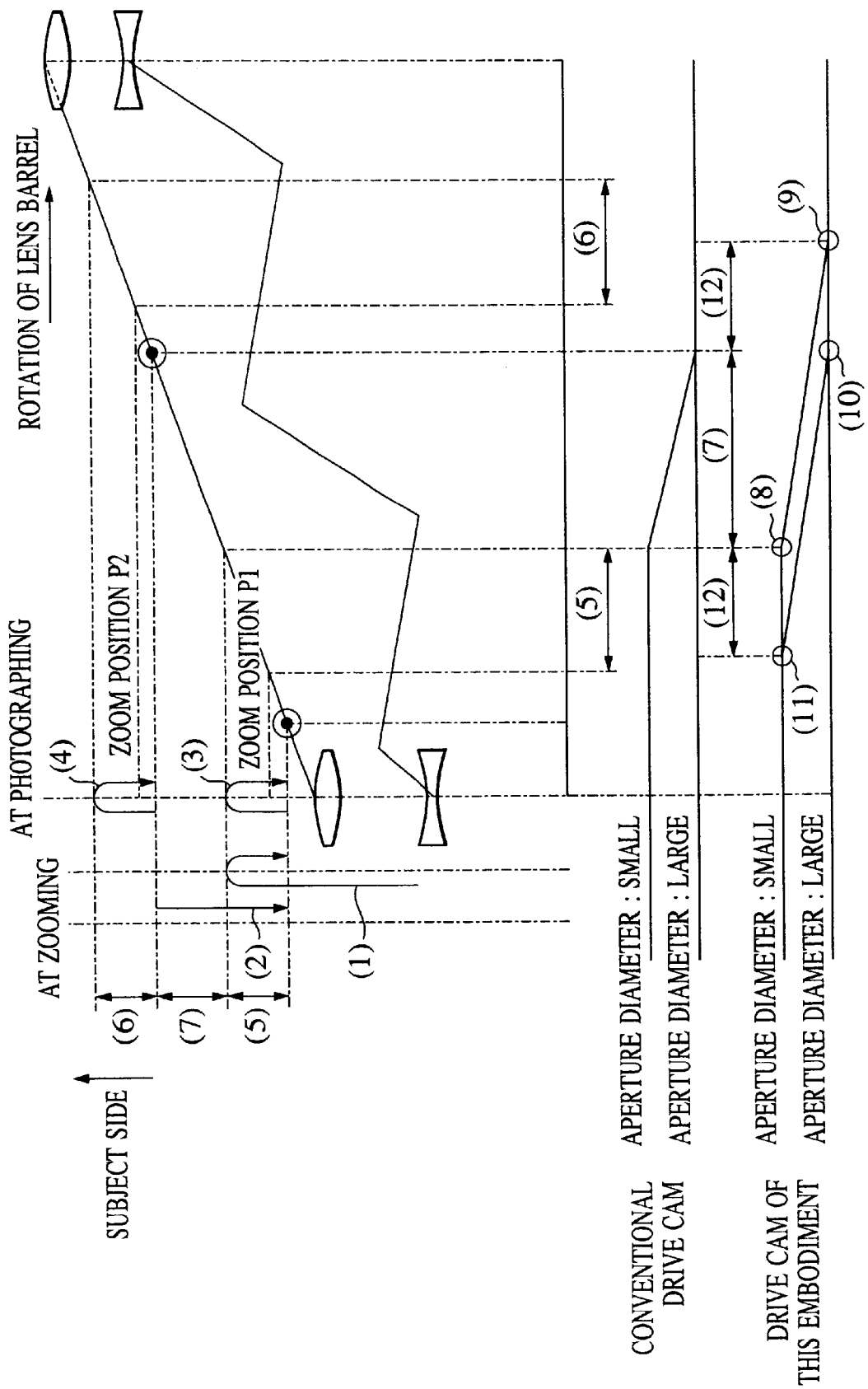
FIG. 1 is an operational diagram of a lens barrel and cam in a camera according to an embodiment of the present invention.

On the other hand, when the lens barrel is zoomed from the zoom position where the focal length is larger than that at the zoom position P1 (i.e., a position on the "tele" side further than the zoom position P1) to the zoom position P1, the lens barrel moves up to the photographing standby position with respect to the zoom position P1, only by the withdrawing action, as indicated by the arrow (2) in FIG. 1.

When focusing is performed after the lens barrel has moved up to the photographing standby position with respect to the zoom position P1 by zooming, the photographing lens-groups (the first photographing-lens group 10 and the second photographing-lens group 11) are extended in the optical axis direction and moved up to the position where a proper focus is achieved, by rotating the lens barrel (the first differential tube 3) about the optical axis by a required rotational angle in response to the subject distance. After the focusing operation, an exposure operation is performed by opening and closing the shutter mechanism 13, and thereby a one-frame photographing operation is completed. Upon completion of the one-frame photographing operation, the lens barrel withdraws up to the photographing standby position with respect to the zoom position P1, and stands by for the next photographing operation. That is, when performing a photographing operation at the zoom position P1, the lens barrel moves as indicated by the arrow (3).

The photographing operation of the camera when a zoom position is set to the zoom position P2, is the same as the above-described photographing operation in the zoom position P1. That is, the lens barrel performs the behavior indicated by the arrow (4) relative to the photographing standby position with respect to the zoom position P2. Specifically, after completing focusing by extending the lens barrel from the photographing standby position with respect to the zoom position P2, an exposure operation (photographing) is performed. After the photographing operation, the lens barrel withdraws up to the photographing standby position with respect to the zoom position P2, and stands by for the next photographing operation.

On the other hand, in the conventional art, when a changeover of the fully-open aperture value is performed between zoom positions P1 and P2, the changeover operation is performed outside the photographing regions with respect to the zoom positions P1 and P2 so as not to affect the photographing operation. More specifically, the changeover of the fully-open aperture value is performed at region (7), between photographing region (5) with respect to the zoom position P1 and the photographing standby position with respect to zoom position P2.

For setting many zoom positions, and for minimizing the rotational angle of the lens barrel, so as to quicken the zooming operation of the lens barrel, it is necessary to minimize the range of region (7). However, if the range of region (7) is made too small, the cam lift rise of the cam (cam groove 9a formed in the straight-advance regulating tube 9 described later) of the fully-open aperture value changeover mechanism at region (7) will become too steep. As a consequence, a stable changeover of the fully-open aperture value cannot be achieved by this mechanism. That is, there is a mechanical limit as to how small region (7) may be made.

In this embodiment, the above-described problem is solved by changing the drive cam in the fully-open aperture value changeover mechanism. In this respect, description will be made with reference to FIG. 1. Here, the "conventional drive cam" and the "drive cam of this embodiment" designations in FIG. 1 each illustrate loci of cams. The mechanical cam configurations will be described later.

First, the fully-open aperture value changeover region when zooming is performed from the zooming position P1 to the zooming position P2, will be explained with reference to FIG. 1.

If the starting point of the changeover of the fully-open aperture value is provided within photographing region (5), with respect to the zoom position P1, the aperture value will be changed over during focusing, so that it will be difficult to control exposure, and thereby the quality of the photograph will be affected. Therefore, the starting point of the changeover of the fully-open aperture value is required to be provided outside photographing region (5). In this embodiment, the starting point of the changeover of the fully-open aperture value is provided at the position indicated by (8) in FIG. 1

On the other hand, the finishing point of the changeover of the fully-open aperture value is provided in the range wherein the lens barrel once extends and then withdraws when moving up to the photographing standby position with respect to zoom position P2. Specifically, the inflection point (9) in the cam, which is the finishing point of the changeover of the fully-open aperture value, is provided within photographing region (6) with respect to the zoom position P2.

With these arrangements, when zooming is performed from the zoom position P1 to the zoom position P2, the fully-open aperture value can be changed over without the need to change the extension and withdrawal operations (shifting operations) of the lens barrel. While, in this embodiment, the inflection point (9) is provided within photographing region (6) with respect to the zoom position P2, the finishing point (inflection point in the cam) of the changeover of the fully-open aperture value is not necessarily required to be provided within the photographing region (6) when the extension of the lens barrel in a shifting operation is performed beyond the photographing region (6). However, since it is necessary to minimize the extension and withdrawal amounts of the lens barrel in order to quicken the shifting action of the lens barrel, it is desirable to provide the finishing point of the changeover of the fully-open aperture value within the photographing region (6).

Next, the fully-open aperture value changeover region when zooming is performed from the zooming position P2 to the zooming position P1, will be explained with reference to FIG. 1.

If the starting point of the changeover of the fully-open aperture value is provided on the photographing region (6) side further than the photographing standby region with respect to the zoom position P2, the aperture value will be changed over during the focusing operation at position P2, so that it will be difficult to control exposure, and thereby the quality of the photograph will be affected. Therefore, the starting point of the changeover of the fully-open aperture value is required to be provided on the zoom position P1 side further than the photographing standby position with respect to the zoom position P2. In this embodiment, the starting point of the changeover of the fully-open aperture value is provided at the position indicated by (10) in FIG. 1

On the other hand, the finishing point of the changeover of the fully-open aperture value is provided in the range wherein the lens barrel withdraws up to the photographing standby position with respect to the zoom position P1. In this embodiment, the inflection point (11) in the cam, which is the finishing point of the changeover of the fully-open aperture value, is provided within the photographing region (5) with respect to the zoom position P1. With this arrangement, when zooming is performed from zoom position P2 to zoom position P1, the fully-open aperture value can be changed over without the need to change the withdrawal operation of the lens barrel. While in this embodiment the finishing point of the changeover of the fully-open aperture value (i.e., the inflection point (11) in the cam) is provided within the photographing region (5), the finishing point of the changeover of the fully-open aperture value may instead be provided in the range from the photographing region (5) to the photographing standby position with respect to zoom position P1.

By providing the cam in the fully-open aperture value changeover mechanism with the configuration as described above, the fully-open aperture value changeover region can be made larger than the changeover region (7) in the cams of conventional fully-open aperture value changeover mechanisms by the combined width of the regions (12). Therefore, even though the photographing standby position with respect to the zoom position P2 is brought close to the photographing region (5) with respect to the zoom position P1, the fully-open aperture value changeover region can be secured, thereby preventing the need to make the cam lift rise of the cam steeper, which otherwise would be caused by the reduction in the width of the fully-open aperture value changeover region. Herein, if the photographing standby position with respect to the zoom position P2 is brought close to the photographing region (5) side with respect to the zoom position P1, it is possible to set many zoom positions and to minimize the rotational angle of the lens barrel, so as to quicken the zooming action of the lens barrel.

Figure 3:
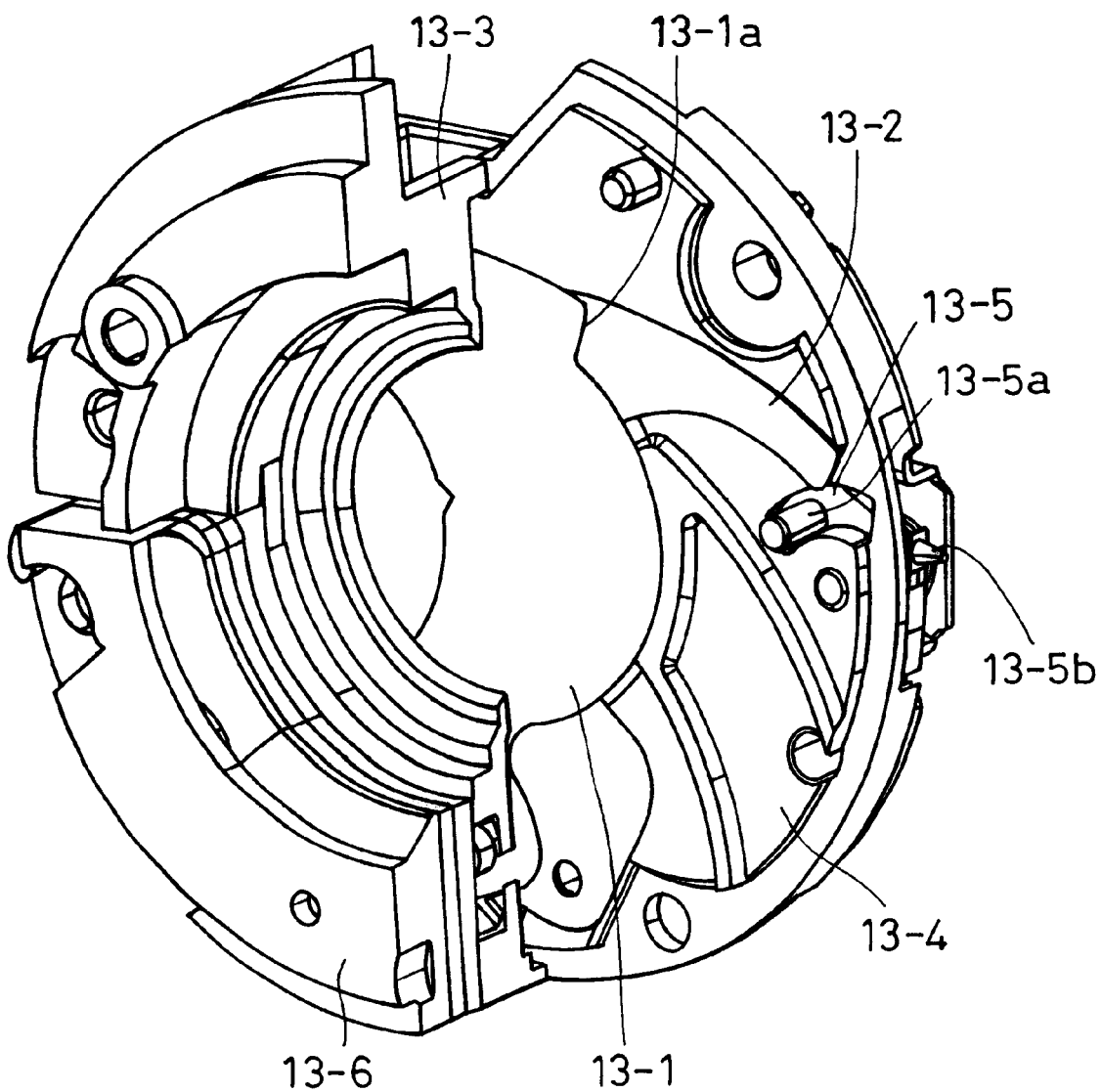
FIG. 3 is a partial sectional view showing the shutter mechanism 13 of the camera according to the embodiment of the present invention.
Figure 4:
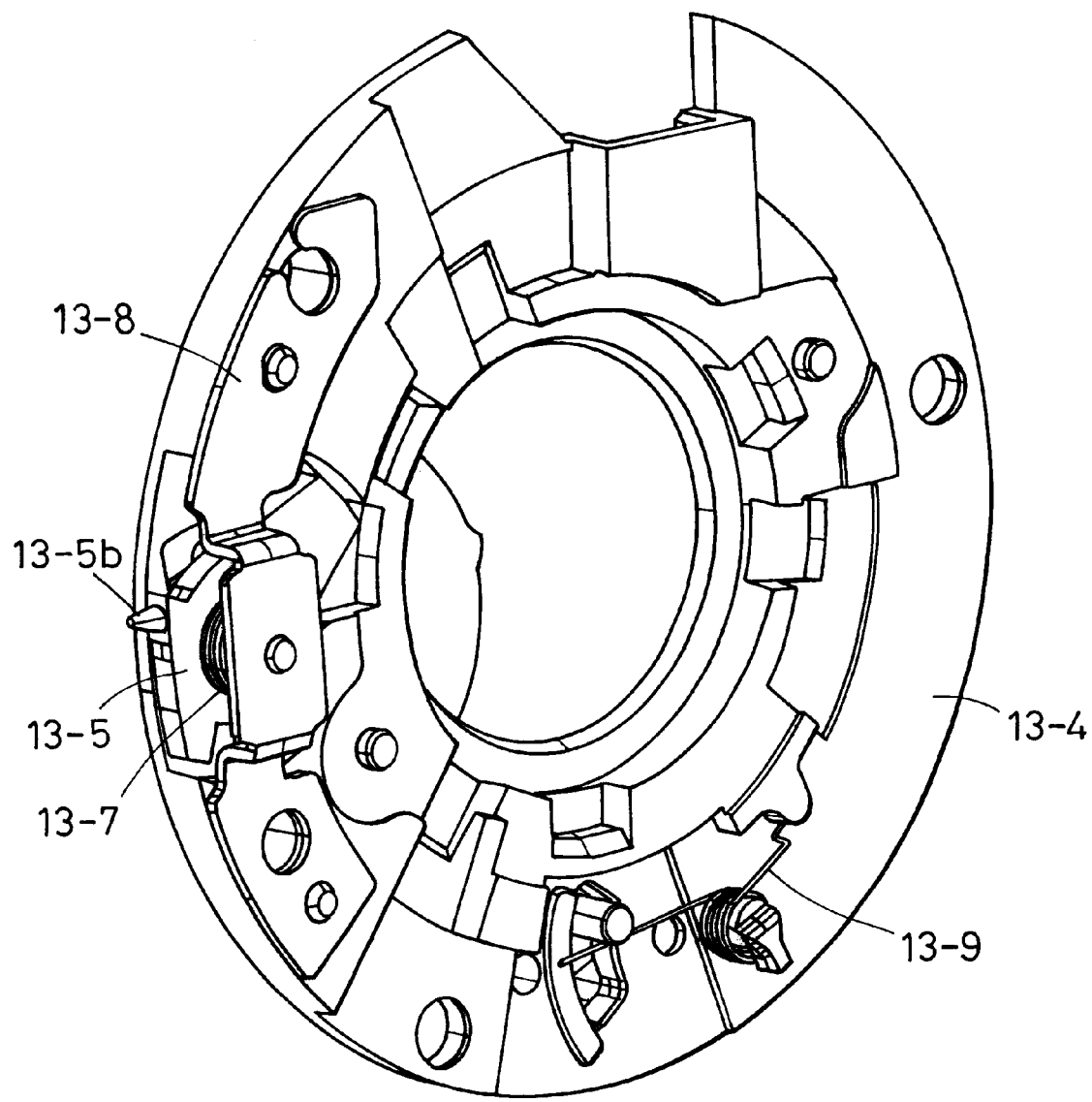
FIG. 4 is a rear elevation showing the shutter mechanism 13 of the camera according to the embodiment of the present invention.

Next, the shutter mechanism 13 will be described with reference to FIGS. 3 and 4. FIG. 3 is a sectional view of the shutter mechanism 13, and FIG. 4 is a rear elevation thereof.

Reference numeral 13-1 denotes a shutter blade (aperture blade) for controlling an aperture, the shutter blade being rotatable about a base end portion. This shutter blade 13-1 has a rotation stopper portion 13-1a. Reference 13-2 also denotes a shutter blade for controlling an aperture, the shutter blade being rotatable about the base end portion. These shutter blades 13-1 and 13-2 are held by holding members 13-3 and 13-4 (unit boards) so as to be clamped therebetween. Holding member 13-3 has a driving unit 13-6 provided for driving the shutter blades 13-1 and 13-2 to open/close. Since such a driving unit 13-6 is known to those in the art, a detailed description thereof will be omitted.

Reference numeral 13-5 designates a rotation regulating member (driving member) for regulating the rotation of the shutter blade 13-1. This rotation regulating member 13-5 is rotatably affixed to the holding member 13-4. The rotation regulating member 13-5 comprises a convex-shaped regulating portion 13-5a to be abutted against the rotation stopper 13-1a of the shutter blade 13-1, and a convex-shaped cam pin portion 13-5b (cam engaging portion) projected from the outer peripheral surface of the shutter mechanism 13. This cam pin portion 13-5b rotates the rotation regulating portion 13-5 under the guide of the cam groove formed in the straight-advance regulating tube 9, as described later.

Reference numeral 13-8 designates a retaining member, which clamps a spring 13-7 (energizing member) and the rotation regulating member 13-5 in cooperation with the holding member 13-4, and of which both ends are fixed by the holding member 13-4. Herein, the spring 13-7 presses the rotation regulating member 13-5 toward the holding member 13-4 side with a spring force. Therefore, even when the rotation regulating member 13-5 moves to a predetermined position while rotating, the rotation regulating member 13-5 can continue to stop at the predetermined position under a frictional force. Reference numeral 13-9 designates a shutter blade closing spring, which is affixed to the holding member 13-4.

Figure 5B:
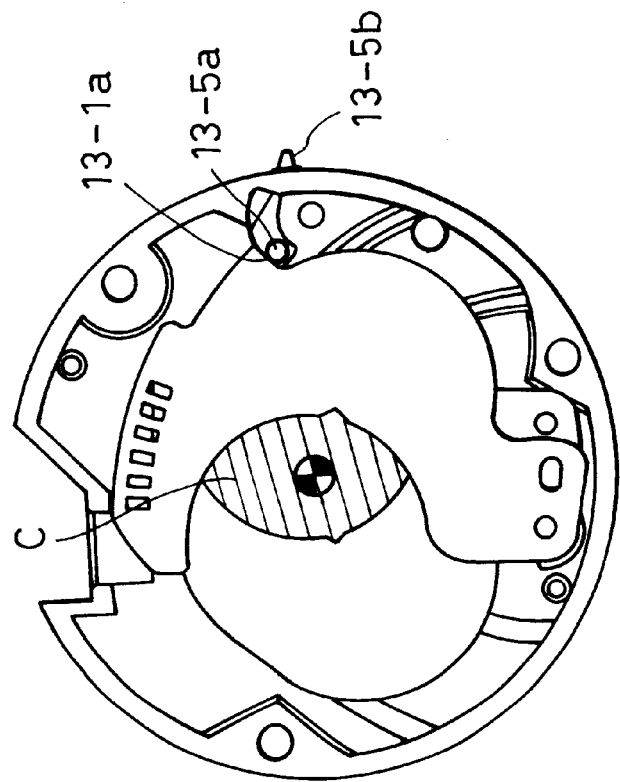
FIGS. 5A and 5B are front views of the shutter mechanism 13 of the camera according to the embodiment of the present invention.
Figure 5A:
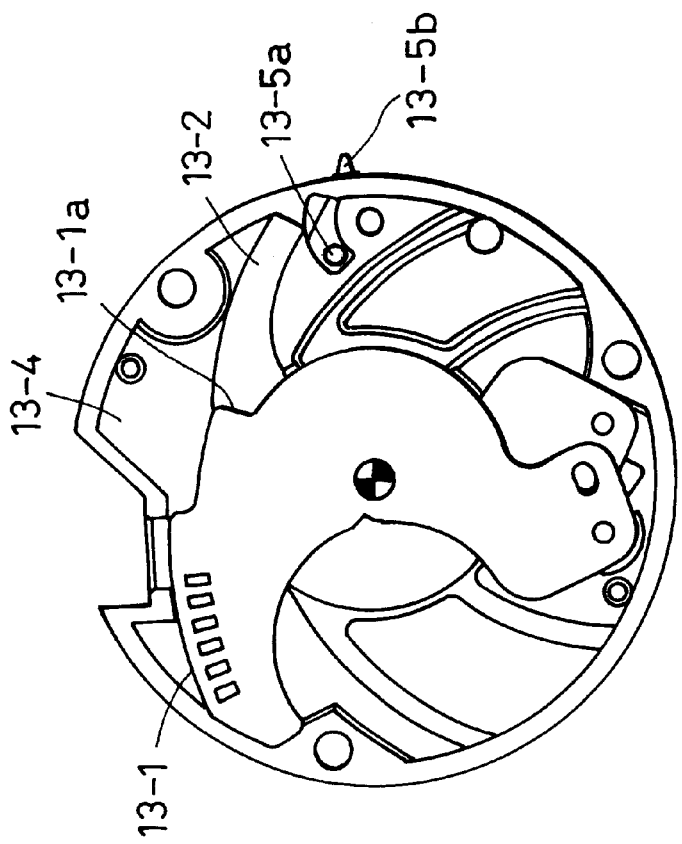

Regarding the shutter mechanism 13 having the above-described configuration, operations of the shutter blades 13-1 and 13-2 based on the rotation of the rotation regulating member 13-5 will be described with reference to FIGS. 5A, 5B, 6A, and 6B. FIGS. 5A and 5B are front views showing the shutter mechanism 13 when the rotation regulating member 13-5 is situated at the position for regulating the rotation of the shutter blade 13-1. When the shutter blades 13-1 and 13-2 change from the state wherein they are closed (FIG. 5A) to the state wherein they are opened (FIG. 5B) by the drive of the driving unit 13-6, the shutter blades 13-1 and 13-2 open the aperture thereof by rotating in mutually opposing directions about their respective base ends. As the shutter blade 13-1 rotates, the rotation stopper portion 13-1a of the shutter blade 13-1 is abutted against the regulating portion 13-5a of the rotation regulating member 13-5, thereby stopping the rotation of the shutter 13-1 (FIG. 5B).

Both shutter blades 13-1 and 13-2 are rotated by a pin (not shown) provided in the driving unit 13-6. Therefore, when rotation of the shutter blade 13-1 stops, rotation of shutter blade 13-2 also stops. Thereby, the region indicated by the hatched portion C in FIG. 5B becomes a shutter diameter (opening area of a light transmitting opening), namely a fully-open aperture value.

Figure 6B:
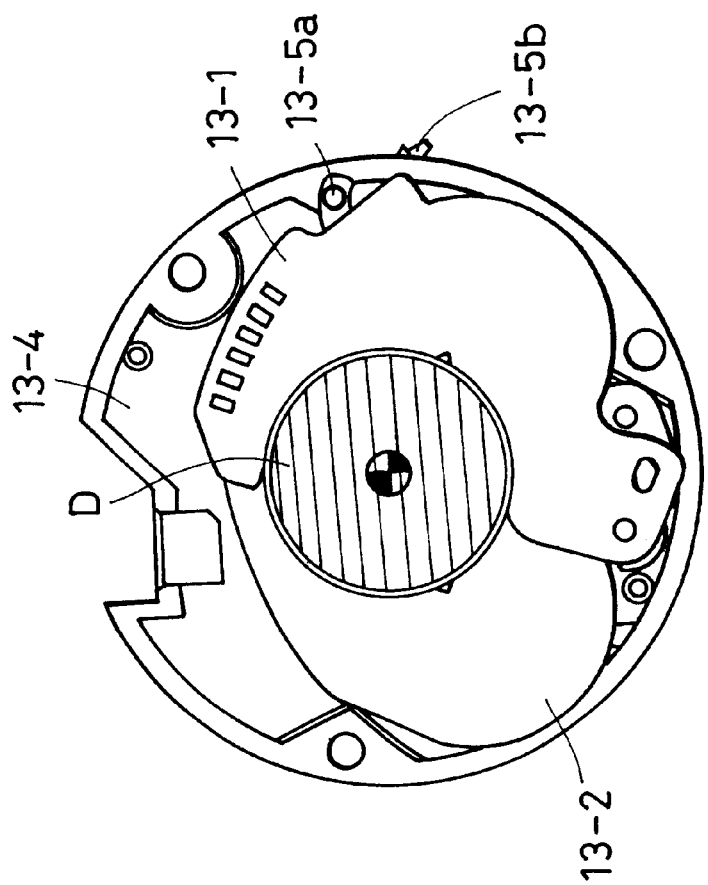
FIGS. 6A and 6B are front views of the shutter mechanism 13 of the camera according to the embodiment of the present invention.
Figure 6A:
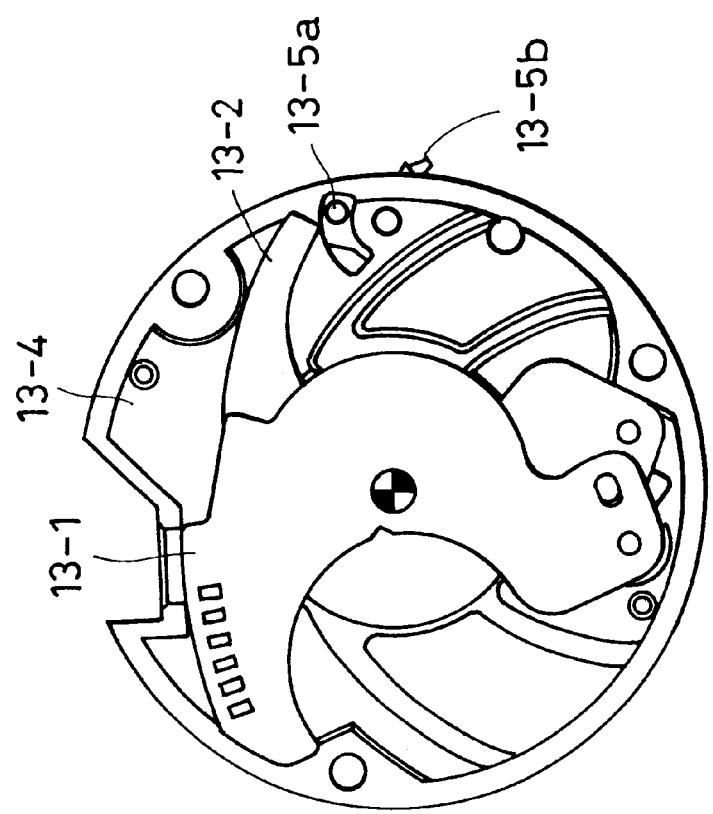

FIGS. 6A and 6B are front views showing the shutter mechanism 13 when the rotation regulating member 13-5 is situated at the position to which the rotation regulating member 13-5 has rotated by a predetermined amount from the position shown in FIGS. 5A and 5B. When the shutter blades 13-1 and 13-2 change from the state wherein they are closed (FIG. 6A) to the state wherein they are opened (FIG. 6B) by the drive of the driving unit 13-6, the shutter blades 13-1 and 13-2 open the aperture thereof by rotating in mutually opposing directions about their respective base ends. At this time, the rotation regulating member 13-5 rotates, thereby moving the regulating portion 13-5a outside the rotation locus of the shutter blade 13-1 (rotation stopper portion 13-1a). As a result, there is no risk that the rotation stopper portion 13-1a of the shutter blade 13-1 is abutted against the regulating portion 13-5a of the rotation regulating member 13-5. Therefore, the diameter of the shutter opening constituted by the shutter blades 13-1 and 13-2 becomes fully open (the region indicated by hatched portion D in FIG. 6B), thereby changing the fully-open aperture value.

As described above, by rotating the rotation regulating member 13-5 to change the position of the regulating portion 13-5a, the fully-open aperture value of the shutter blades 13-1 and 13-2 can be variably set. If the rotation regulating member 13-5 is arranged to be rotated by cam-driving the cam pin portion 13-5a formed thereon, the fully-open aperture value of the shutter blades 13-1 and 13-2 could be changed.

Figure 7A:
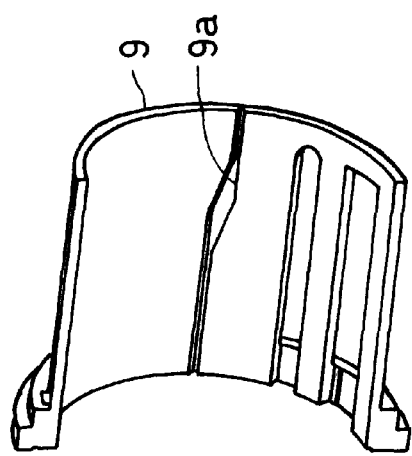
Figure 7B:
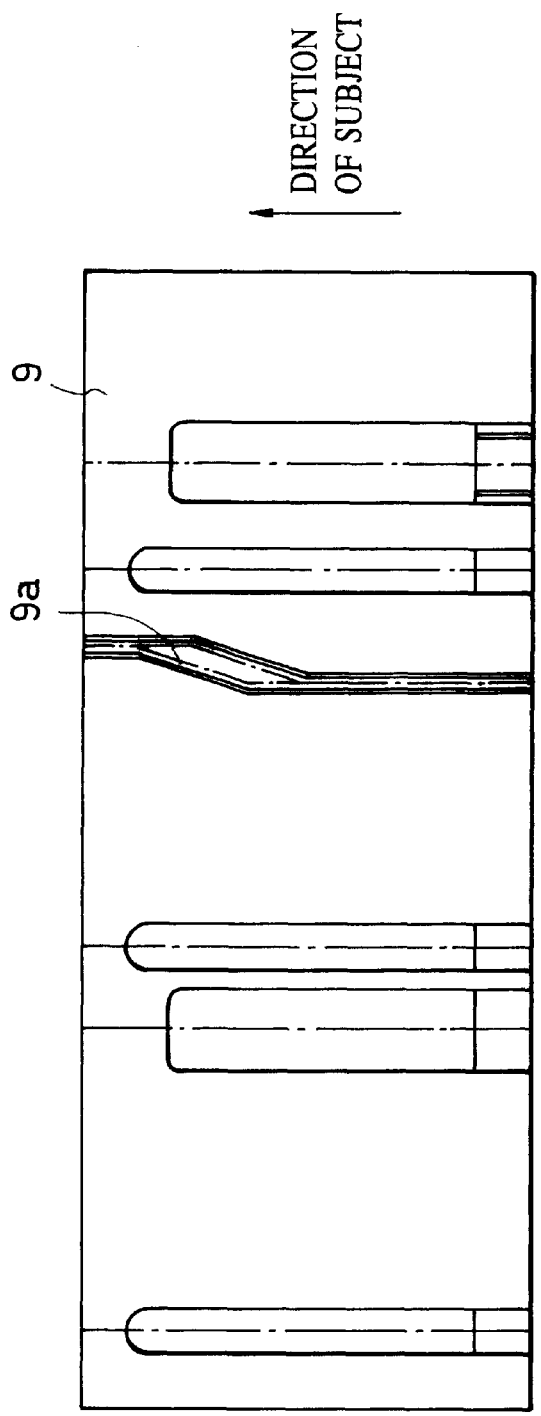

As shown in FIGS. 7A and 7B, in this embodiment, a cam groove 9a (which corresponds to the "cam of this embodiment" in FIG. 1) is formed on the inner peripheral surface of the straight-advance regulating tube 9. This cam groove 9a is engaged with the cam pin portion 13-5b of the rotation regulating member 13-5, and the rotation regulating member 13-5 is rotated by moving the cam pin portion 13-5b along the cam groove 9a. Here, FIG. 7A is a sectional view showing the straight-advance regulating tube 9, and FIG. 7B is a developed view thereof.

Next, a specific explanation will be made of the cam in the above described fully-open aperture value changing mechanism described with reference to FIG. 1. That is, operations of the cam pin portion 13-5b of the rotation regulating member 13-5 to be engaged with the cam groove 9a will be described with reference to FIG. 8. FIG. 8 is a partially enlarged view showing the cam groove 9a formed in the straight-advance regulating tube 9. Generally, in the photographing optical system, the regulation of the fully-open aperture value is performed when the focal length is small, while this regulation is removed when the focal length is large.

First, photographing operations of the camera when set at the zoom position P1, will be treated. Upon completion of a zooming operation, the lens barrel stands by at the photographing standby position with respect to the zoom position P1. A release button provided on the cameras body is depressed by the photographer up to the first stroke position, and thereby the extension amount of the lens barrel is calculated based on a measurement of distance to the subject to be photographed. Based on this calculation result, the camera performs a focusing operation by extending the photographing lens group (the first photographing lens group 10 and the second photographing lens group 11) by a required amount in the optical axis direction.

Herein, the cam pin portion 13-5*b* of the rotation regulating member 13-5 moves along the cam groove 9*a* of the straight-advance regulating tube 9. In this cam groove 9*a*, the region when focusing is performed (i.e., the region (5) in FIG. 1), extends in the optical axis direction, so that the rotation regulating member 13-5 does not rotate. At this time, since the regulation portion 13-5*a* and cam pin portion 13-5*b* of the rotation regulating member 13-5 are situated at the positions shown in FIG. 9A, the rotation stopper portion 13-1*a* of the shutter blade 13-1 is abutted against the regulation portion 13-5*a*, and thereby rotation regulation is performed. When this rotation regulation is performed, the fully-open aperture value of the shutter blades 13-1 and 13-2 is relatively small, as described above. With such an arrangement, when the photographer further depresses the release button up to the second stroke position, a focusing operation is performed, and then the shutter blades 13-1 and 13-2 are opened and closed by the drive of the driving unit 13-6, to perform an exposure operation. After completing the exposure operation, the camera stands by for photographing of the next frame by withdrawing the lens barrel up to the photographing standby position with respect to the zoom position P1.

Next, photographing operations of the camera when set at the zoom position P2, will be treated. Upon completion of a zooming operation, the lens barrel stands by at the photographing standby position with respect to the zoom position P2. When the photographer depresses the release button provided on the camera body up to the first stroke position, the distance to the subject to be photographed is measured, and then the extension amount of the lens barrel is calculated. As in the case where the camera is set at the zoom position P1, based on this calculation result, the camera performs a focusing operation by extending the photographing lens group (the first photographing lens group 10 and the second photographing lens group 11) by a required amount in the optical axis direction.

Herein, the cam pin portion 13-5*b* of the rotation regulating member 13-5 moves along the cam groove 9*a* of the straight-advance regulating tube 9. In this cam groove 9*a*, the region when focusing is performed (i.e., the region (6) in FIG. 1), extends in the optical axis direction, so that the rotation regulating member 13-5 does not rotate. At this time, the regulation portion 13-5*a* and cam pin portion 13-5*b* of the rotation regulating member 13-5 are situated at the positions shown in FIG. 9B due to the operation described later. These positions are different from their positions when the camera is set at the zoom position P1 (see FIG. 9A). As a result, the shutter blades 13-1 and 13-2 fully open, and the fully-open aperture value becomes relatively large, as shown in FIG. 6B. With such an arrangement, when the photographer depresses the release button up to the second stroke position, a focusing operation is performed, and then the shutter blades 13-1 and 13-2 are opened and closed by the drive of the driving unit 13-6, to perform an exposure operation. After completing the exposure operation, the camera stands by for the photographing of the next frame by withdrawing the lens barrel up to the photographing standby position with respect to the zoom position P2.

Next, zooming (extension operation) from the zoom position P1 to the zoom position P2, will be treated. When the camera is set at zoom position P1, the regulation portion 13-5*a* and cam pin portion 13-5*b* of the rotation regulating member 13-5 are situated at the positions shown in FIG. 9A. By the extension of the lens barrel from the photographing standby position with respect to the zoom position P1 in the zooming operation, the cam pin portion 13-5*b* of the rotation regulating member 13-5 moves in the optical axis direction along the cam groove 9*a* formed on the inner peripheral surface of the straight-advance tube 9, and when the regulation portion 13-5*a* comes to the position indicated by "A" in FIG. 8 (i.e., the inflection point (8) in FIG. 1), it abuts against the cam surface 9*a*1 of the cam groove 9*a*. Once the cam pin portion 13-5*b* becomes abutted against the cam surface 9*a*1, the cam pin portion 13-5*b* of the rotation regulating member 13-5 begins to move about the optical axis under the guide of the cam surface 9*a*1 of the cam groove 9*a*. As the cam pin portion 13-5*b* of the rotation regulating member 13-5 moves about the optical axis, the rotation regulating member 13-5 rotates. The cam pin portion 13-5*b* of the rotation regulating member 13-5 moves about the optical axis until it reaches the inflection point "B" in FIG. 8 (i.e., the inflection point (9) in FIG. 1), which is the finishing point of the cam surface 9*a*1. Herein, the inflection point "B" is provided in the range of the photographing region with respect to the zoom position P2 (i.e., the region (6) in FIG. 1), as described above.

After the lens barrel has extended up to the side closest to the subject in the photographing region with respect to the zoom position P2, the lens barrel withdraws up to the photographing standby position with respect to the zoom position P2. The camera according to this embodiment is arranged so that the viewfinder optical system is zoomed in operative association with the zooming of the photographing optical system (not shown), and so that, in order to correct the visual field ratio of the viewfinder at the zoom position P2, the photographing optical system (lens barrel) is extended up to the side closest to the subject, while the operative association thereof with the viewfinder optical system is disconnected during the withdrawal thereof.

When the lens barrel extends up to the side closest to the subject in the photographing region with respect to the zoom position P2, the cam pin portion 13-5*b* of the rotation regulating member 13-5 moves in the optical axis direction under the guide of the cam groove 9*a*, by the range "X" beyond the inflection point "B". By this movement of the cam pin portion 13-5*b* up to the region "X" in the cam groove 9*a*, the regulating portion 13-5*a* and cam pin portion 13-5*b* of the rotation regulating member 13-5 reliably move up to the position shown in FIG. 9B. When the lens barrel withdraws up to the photographing standby position with respect of the zoom position P2, the cam pin portion 13-5*b* of the rotation regulating member 13-5 moves up to the photographing standby position with respect of the zoom position P2. At this time, since the cam pin portion 13-5*b* only moves in the optical axis direction, the rotation regulating member 13-5 does not rotate, but stays at the position shown in FIG. 9B. Thereby, even though the shutter blades 13-1 and 13-2 rotate, the shutter blade 13-1 can change the fully-open aperture value without being hindered by the regulating portion 13-5*a* of the rotation regulating member 13-5 from rotating (FIG. 6A). As described above, since the rotation regulating member 13-5 is pressed toward the holding member 13-4 side by spring 13-7, the rotation regulating member 13-5 is held at the position shown in FIG. 9B even during a lens barrel withdrawal operation. Likewise, since the rotation regulating member 13-5 does not become unstable during focusing, there is no risk of affecting the photographing.

By the above described operations, the fully-open aperture value of the shutter mechanism 13 can be changed over without changing the extension and withdrawal operations of the lens barrel in a zooming operation from zoom position P1 to zoom position P2.

In conventional shutter mechanisms, the changeover of the fully-open aperture value is performed in the range indicated by "Z" in FIG. 8 (i.e., the region (7) in FIG. 1). In this embodiment, however, the changeover of the fully-open aperture value is performed in the range indicated by "W" in FIG. 8, (i.e., the regions (7)+(12) in FIG. 1). That is, in this embodiment, the width of the fully-open aperture value changeover region is set to be larger than that of the conventional fully-open aperture value changeover region. Therefore, the cam lift rise in the cam groove 9a is prevented from becoming too steep, thereby allowing the regulating portion 13-5a to perform stable driving. In addition, since a fully-open aperture value changeover region can be secured even though the range of the region "Z" is reduced, many zoom positions can be set, and the rotational angle of the lens barrel can be minimized so as to quicken the zooming action of the lens barrel.

Next, a zooming (withdrawal operation) from zoom position P2 to zoom position P1, will be treated. When the camera is set at zoom position P2, the regulation portion 13-5a and cam pin portion 13-5b of the rotation regulating member 13-5 are situated at the positions shown in FIG. 9B. By the withdrawal of the lens barrel from the photographing standby position with respect to zoom position P2 in the zooming operation, the cam pin portion 13-5b of the rotation regulating member 13-5 moves in the optical axis direction along the cam groove 9a formed on the inner peripheral surface of the straight-advance tube 9, and when the regulation portion 13-5a comes to the position indicated by "C" in FIG. 8 (i.e., the inflection point (10) in FIG. 1), it abuts against the cam surface 9a2 of the cam groove 9a. Once the cam pin portion 13-5b becomes abutted against the cam surface 9a2, the cam pin portion 13-5b of the rotation regulating member 13-5 begins to move about the optical axis under the guide of the cam surface 9a2 of the cam groove 9a. By this movement about the optical axis, of the cam pin portion 13-5b of the regulating member 13-5, the rotation regulating member 13-5 rotates. The cam pin portion 13-5b of the rotation regulating member 13-5 moves about the optical axis until it reaches the inflection point "D" in FIG. 8 (i.e., the inflection point (11) in FIG. 1), which is the finishing point of the cam surface 9a2. Herein, the inflection point "D" is provided in the range of the photographing region with respect to the zoom position P1 (i.e., the region (5) in FIG. 1), as described above.

Figure 9A:
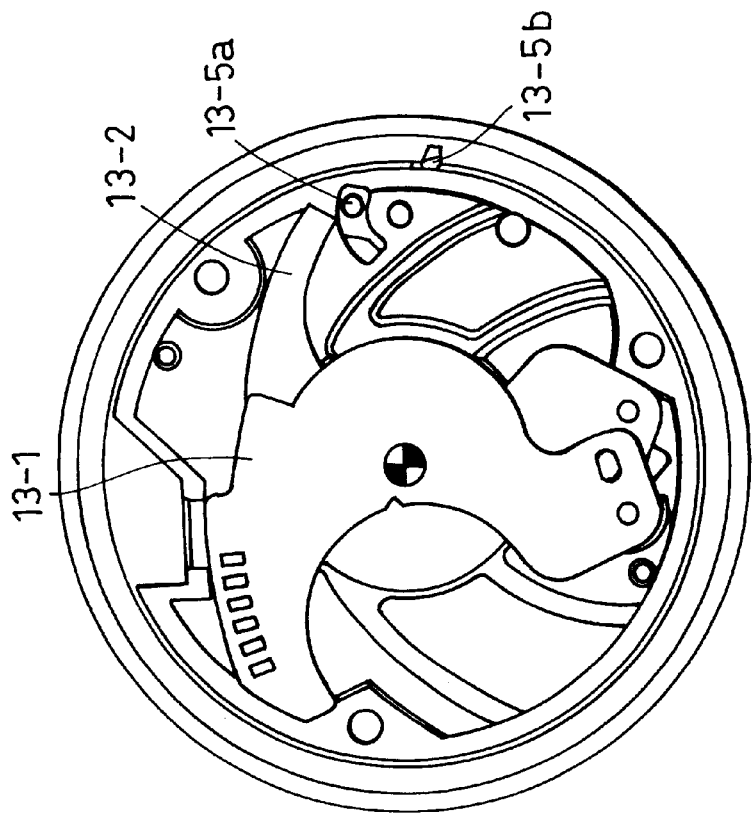
FIGS. 9A and 9B are front views of the shutter mechanism 13 of the camera according to the embodiment of the present invention.
Figure 9B:
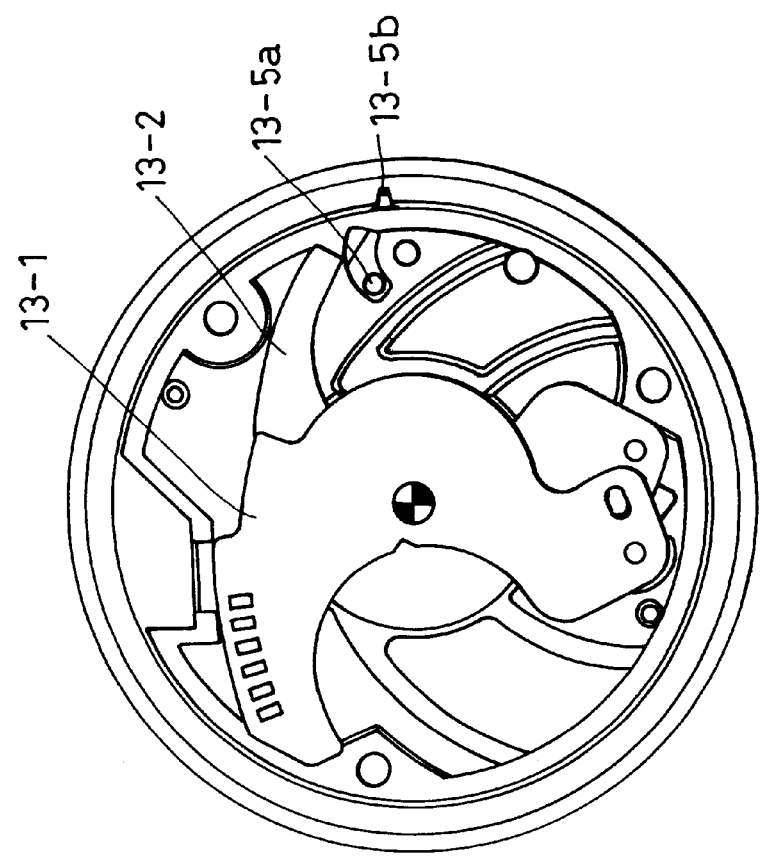

By the movement of the cam pin portion 13-5b up to the inflection point "D" in the cam groove 9a, the regulating portion 13-5a and cam pin portion 13-5b of the rotation regulating member 13-5 reliably move up to the position shown in FIG. 9A.

When the lens barrel withdraws up to the photographing standby position with respect of the zoom position P1, the cam pin portion 13-5b moves up to the photographing standby position with respect of the zoom position P1. At this time, since the cam pin portion 13-5b only moves in the optical axis direction, the rotation regulating member 13-5 does not rotate, but stays at the position shown in FIG. 9A. Herein, when the shutter blades 13-1 and 13-2 rotate, the rotation stopper portion 13-1a of the shutter blade 13-1 is abutted against the rotation regulating portion 13-5a, and rotation of the shutter blades 13-1 and 13-2 stops, thereby changing over the fully-open aperture value (see FIG. 5B).

As described above, since the rotation regulating member 13-5 is pressed toward the holding member 13-4 side by he spring 13-7, the rotation regulating member 13-5 is held at the position shown in FIG. 9A. Thereby, positioning of the rotation regulating member 13-5 does not become unstable during focusing operation, and thereby there is no risk of affecting the photographing operation.

As in the case where zooming is performed from the zoom positions P1 to the zoom position P2, in the case where zooming is performed from the zoom positions P2 to the zoom position P1, since the width of the fully-open aperture value changeover region is set to be larger than that of the conventional fully-open aperture value changeover region, the cam lift rise in the cam groove 9a is prevented from becoming too steep, thereby allowing the regulating portion 13-5a to perform stable driving. In addition, since a fully-open aperture value changeover region can be secured even though the range of the region "Z" is reduced, many zoom positions can be set, and the rotational angle of the lens barrel can be minimized, so as to quicken the zooming action of the lens barrel.

As is evident from the foregoing, according to the present invention, in either of the cases where zooming is performed from the zoom position P1 to P2, and from the zoom position P2 to P1, the width of the fully-open aperture value changeover region (corresponding to the range "W" in the cam) is set to be larger than that of the conventional fully-open aperture value changeover region (corresponding to the range "Z" in the cam). This makes it possible to prevent the cam lift rise of the cam in the fully-open aperture value changeover mechanism from becoming too steep, thereby allowing the regulating portion to perform stable driving. Furthermore, a fully-open aperture value changeover region can be secured even though the range of the above-described region "Z" is reduced. This enables many zoom positions to be set, and allows the rotational angle of the lens barrel to be minimized, so as to quicken the zooming action of the lens barrel, without impairing the smooth zooming and focusing of the photographing lenses.

While the present invention has been described with reference to what are presently considered to be the preferred embodiment, it is to be understood that the invention is not limited to the disclosed embodiment. On the contrary, the invention is intended to cover various modifications and equivalent arrangements included within the spirit and scope of the appended claims. The scope of following claims is to be accorded the broadest interpretation so as to encompass all such modifications and equivalent structures and functions.

What is claimed is:

1. A lens barrel, comprising:
   a variable power lens unit;
   an aperture-variable light-amount adjusting unit having an aperture and an adjusting member that adjusts a fully open state of the aperture;
   a variable power lens control mechanism that controls movement of said variable power lens unit from a first variable power position to a second variable power position, where said variable power lens control mechanism first moves said variable power lens unit to a position beyond the second variable power position, then returns said variable power lens toward the second variable power position and stops said variable power lens at the second variable power position; and a cam member having a cam portion with which said adjusting member is engaged, and movable relative to said light-amount adjusting unit in operative association with a control action of said variable power lens control mechanism, wherein said cam portion has a cam shape that drives said adjusting member so as to adjust the fully open state of the aperture while said variable power lens control mechanism first moves said variable power lens unit to a position beyond the second variable power position, but does not drive said adjusting member while said variable power lens unit is returned toward the second variable power position by said variable power lens control mechanism.

2. A lens barrel according to claim 1, wherein said cam member moves in the optical axis direction of said variable power lens unit in operative association with the control action of said variable power lens control mechanism.

3. A lens barrel according to claim 1, wherein, when said variable power lens control mechanism moves said variable power lens unit from the second variable power position to the first variable power position, said variable power lens control mechanism stops said variable power lens unit at the first variable power position without first moving said variable power lens unit to a position beyond the first variable power position.

4. A lens barrel according to claim 3, wherein said cam portion has a shape that guides said adjusting member when said variable power lens control mechanism moves said variable power lens unit from the second variable power position to the first variable power position.

5. A lens barrel according to claim 1, wherein said variable power lens control mechanism has a cam ring formed in a manner such that variable power cam portions which drive said variable power lens unit for scaling, and focus cam portions which drive said variable power lens unit for focusing, during extension of said variable power cam portion, are arranged in an alternating sequence.

6. A lens barrel according to claim 5, wherein said cam portion has a shape that does not drive said adjusting member when said variable power lens unit moves on said focus cam portion for focusing.

7. A camera comprising:

a lens barrel comprising:

a variable power lens unit;

an aperture-variable light-amount adjusting unit having an aperture and an adjusting member that adjusts a fully open state of the aperture;

a variable power lens control mechanism that controls movement of said variable power lens unit from a first variable power position to a second variable power position, where said variable power lens control mechanism first moves said variable power lens unit to a position beyond the second variable power position, then returns said variable power lens toward the second variable power position and stops said variable power lens at the second variable power position; and a cam member having a cam portion with which said adjusting member is engaged, and movable relative to said light-amount adjusting unit in operative association with a control action of said variable power lens control mechanism, wherein said cam portion has a cam shape that drives said adjusting member so as to adjust the fully open state of the aperture while said variable power lens control mechanism first moves said variable power lens unit to a position beyond the second variable power position, but does not drive said adjusting member while said variable power lens unit is returned toward the second variable power position by said variable power lens control mechanism.

* * * * *

UNITED STATES PATENT AND TRADEMARK OFFICE
CERTIFICATE OF CORRECTION

PATENT NO. : 6,603,609 B2         Page 1 of 1
DATED     : August 5, 2003
INVENTOR(S) : Ryuichi Nagae It is certified that error appears in the above-identified patent and that said Letters Patent is hereby corrected as shown below:

<u>Column 4,</u>
Line 1, "stop" should read -- stops --.

<u>Column 14,</u>
Line 9, "he" should read -- the --.
Line 16, "positions P1" should read -- position P1 --.
Line 17, "positions P2" should read -- position P2 --.
Line 53, "following" should read -- the following --.

Signed and Sealed this

Third Day of February, 2004

JON W. DUDAS
*Acting Director of the United States Patent and Trademark Office*